(12) United States Patent
Ma

(10) Patent No.: US 6,282,156 B1
(45) Date of Patent: *Aug. 28, 2001

(54) METHOD OF FAST TRACKING FOR AN OPTICAL PICK-UP AND APPARATUS THEREOF

(75) Inventor: Chung-Hsun Ma, Taipei Hsien (TW)

(73) Assignee: Winbond Electronics Corp., Hsinchu (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,535

(22) Filed: Jul. 24, 1998

(30) Foreign Application Priority Data

Mar. 12, 1998 (TW) .................................. 87103635

(51) Int. Cl.$^7$ ........................................................ G11B 7/09
(52) U.S. Cl. ................................. 369/44.28; 369/53.29
(58) Field of Search ............................... 369/44.28, 50; 370/73.03

(56) References Cited

U.S. PATENT DOCUMENTS

| | | | |
|---|---|---|---|
| 4,357,635 | * 11/1982 | Hasegawa | 360/73.03 X |
| 4,680,746 | * 7/1987 | Senso | 360/73.03 X |
| 4,691,310 | * 9/1987 | Wine | 360/73.03 X |
| 4,809,248 | * 2/1989 | Sengoku | 360/73.03 X |
| 4,918,676 | * 4/1990 | Miyasaka | 369/44.28 X |
| 5,038,333 | * 8/1991 | Chow et al. | 369/44.28 |
| 5,063,549 | * 11/1991 | Yamamuro | 369/44.28 |
| 5,523,988 | * 6/1996 | Chiba | 369/44.28 |
| 5,717,672 | * 2/1998 | Furukawa et al. | 369/50 |
| 5,768,231 | * 6/1998 | Sagata | 369/50 |

* cited by examiner

Primary Examiner—Aristotelis M Psitos
(74) Attorney, Agent, or Firm—Ladas & Parry

(57) ABSTRACT

A method for reducing the travel time for an optical pick-up and an apparatus thereof are provided to precisely control the tracking of said optical pick-up. The method comprises the steps of: (i) detecting the number of revolutions of the optical disc to determine the number of track-jumping signals produced in a unit time due to the rotation of the optical disc; and (ii) adding the number of track-jumping signals obtained in step(i) to the number of track-jumping signals detected in a unit time by the pick-up controller in the case that the optical pick-up moves outwardly, and subtracting the number of track-jumping signals obtained in step(i) from the number of track-jumping signals detected in a unit time by the pick-up controller in the case that the optical pick-up moves inwardly.

4 Claims, 5 Drawing Sheets

METHOD OF FAST TRACKING FOR AN OPTICAL PICK-UP AND APPARATUS THEREOF

BACKGROUND OF THE INVENTION

1. Field of the invention

The present invention relates to a method for reducing the travel time for an optical pick-up and an apparatus thereof by taking into consideration the effect of the rotation of an optical disk on the search process of the optical pick-up so as to more precisely control its tracking.

2. Description of prior art

In prior art, there are two operating modes to access an optical disk, i.e., CLV (constant linear velocity) mode and CAV (constant angular velocity) mode. The CLV mode adjusts the rotation speed of an optical disk according to the location of the pick-up. That is, the rotation speed of the optical disk while the pick-up is at the outer portion of the optical disk is slower than that while the pick-up is at the inner portion of the optical disk. In the CAV mode, on the other hand, the rotation speed of the optical disk is constant, e.g., it is not varied according to the location of the pick-up. It is common to access an optical disk by using both of the CLV mode and the CAV mode in a practical application. The rotation speed to access optical disks is normally several thousands RPM or more.

In the known technologies, travel time is defined as the time required for the optical pickup to move until reaching the desired location of the optical disc. To reduce the travel time, the optical pick-up can move rapidly by a "track jump". The track-jumping signal is used to control the search process of the optical pick-up. However, while the optical disk is rotated at a high speed, the effect of this high-speed rotation on the track-jumping signal has never been addressed. In fact, when the optical disk is rotated at high speed, the track-jumping signal detected by the pick-up controller is not equal to the tracks actually being jumped by the pick-up. Referring to FIG. 1a, in the case that the optical disk is still, track-jumping signals are respectively generated at positions A, B, C, D, E and F. Therefore, six track-jumping signals are generated while the pick-up is moved from A to F, i.e., from the n-th track to the n+5-th track. The arrow in the drawing indicates the direction that the optical disk rotates. Referring to FIG. 1b, in the case that the optical disk is rotated at high speed, track-jumping signals are respectively generated at positions A', B', C', D' and E'. Therefore, only five track-jumping signals are generated while the pick-up is moved from A' to E', i.e., from the n-th track to the n+5-th track. By comparing the results of FIGS. 1a and 1b, it is found that different numbers of track-jumping signals are obtained while the pick-up is jumping the same number of track for the optical disk depending on whether it is still or rotating at high speed. Accordingly, errors will occur when the search process of a pick-up is controlled without considering the effect of high-speed rotation of the optical disk. In order to precisely place the pick-up at the predetermined destination, the controller needs to compensate for such errors by means of subsequent correction. However, this results in a longer travel time for the pick-up.

Referring to FIG. 2, the data recorded on an optical disk is sequentially arranged in a spiral. Even when the pick-up is still, the pick-up controller will continuously detect a track-jumping signal at the position A" if the optical disk is rotated. The number of track-jumping signals being detected in a certain period is equal to the number of revolutions of the optical disk in said period.

SUMMARY OF THE INVENTION

Accordingly, the object of this invention is to provide a method for reducing the travel time for an optical pick-up and an apparatus thereof. This invention uses a speed-detecting device to detect the number of revolutions of an optical disk in a unit time. The number of revolutions equals the number of track-jumping signals detected by the pick-up controller in the unit time if the pick-up remains still. The real number of the tracks being jumped by the pick-up in the unit time, that is the real track-jumping velocity, can be obtained by adding "the number of revolutions in the unit time" to or subtracting "the number of revolutions in the unit time" from the detected number of the jumped tracks, corresponding to the outward or inward moving pick-up.

Further, a microprocessor can be used to determine the number of track-jumping signals detected due to the rotation of optical disk by multiplying the number of revolutions of the optical disk in the unit time by the estimated travel time for the pick-up. The real number of track-jumping signals detected when the pick-up is moved to the predetermined destination can be obtained by adding or subtracting the detected number of track-jumping signals to or from said number of tracking-jumping signals due to rotation, corresponding to the outward or inward moving pick-up.

Once the real number of track-jumping signals is obtained, it can be used to precisely control the search process of an optical pick-up so as to reduce its travel time.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

While detecting the rotation speed, a pick-up controller can be used to control the tracking and focussing of an optical pick-up, and to detect a first duration of a synchronous signal recorded on an optical disk while accessing the optical disk. Thereafter, a microprocessor can be used to divide the first duration by a second duration of the synchronous signal which is measured under a known rotation speed, and then multiply by the known rotation speed to obtain a practical rotation speed of the optical disk.

Figure 1A:
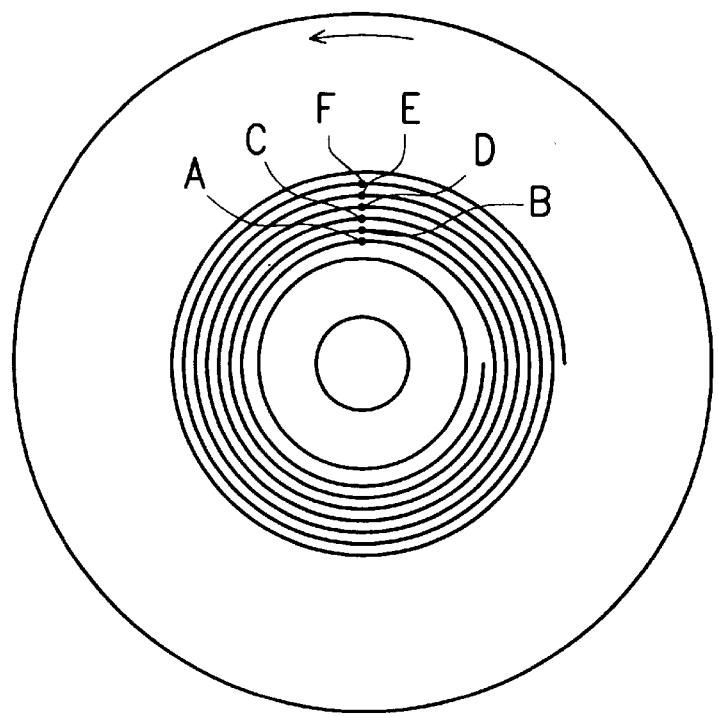
FIG. 1a illustrates the relation of the track-jumping signal and the tracks being jumped by the pick-up when the optical disk is still.
Figure 1B:
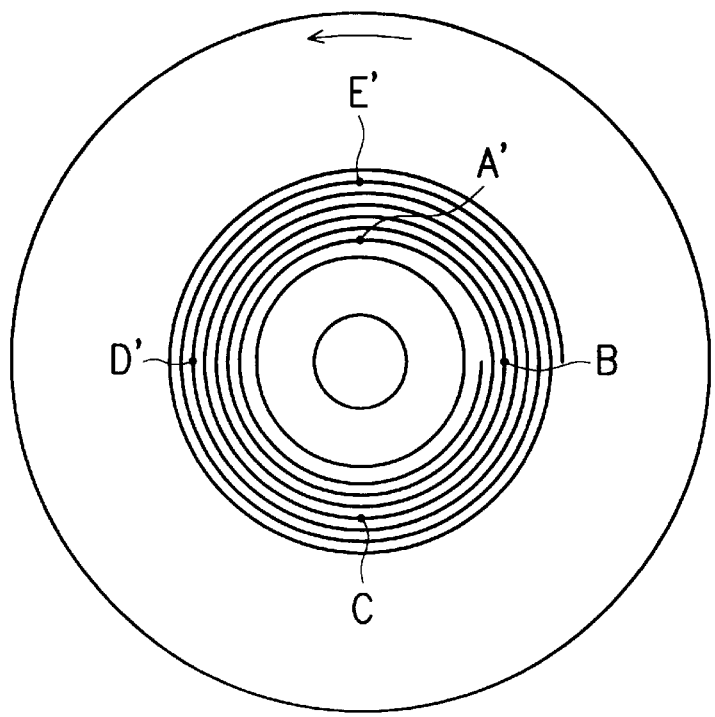
FIG. 1b illustrates the relation of the track-jumping signal and the tracks being jumped by the pick-up when the optical disk is rotated at high speed.
Figure 2:
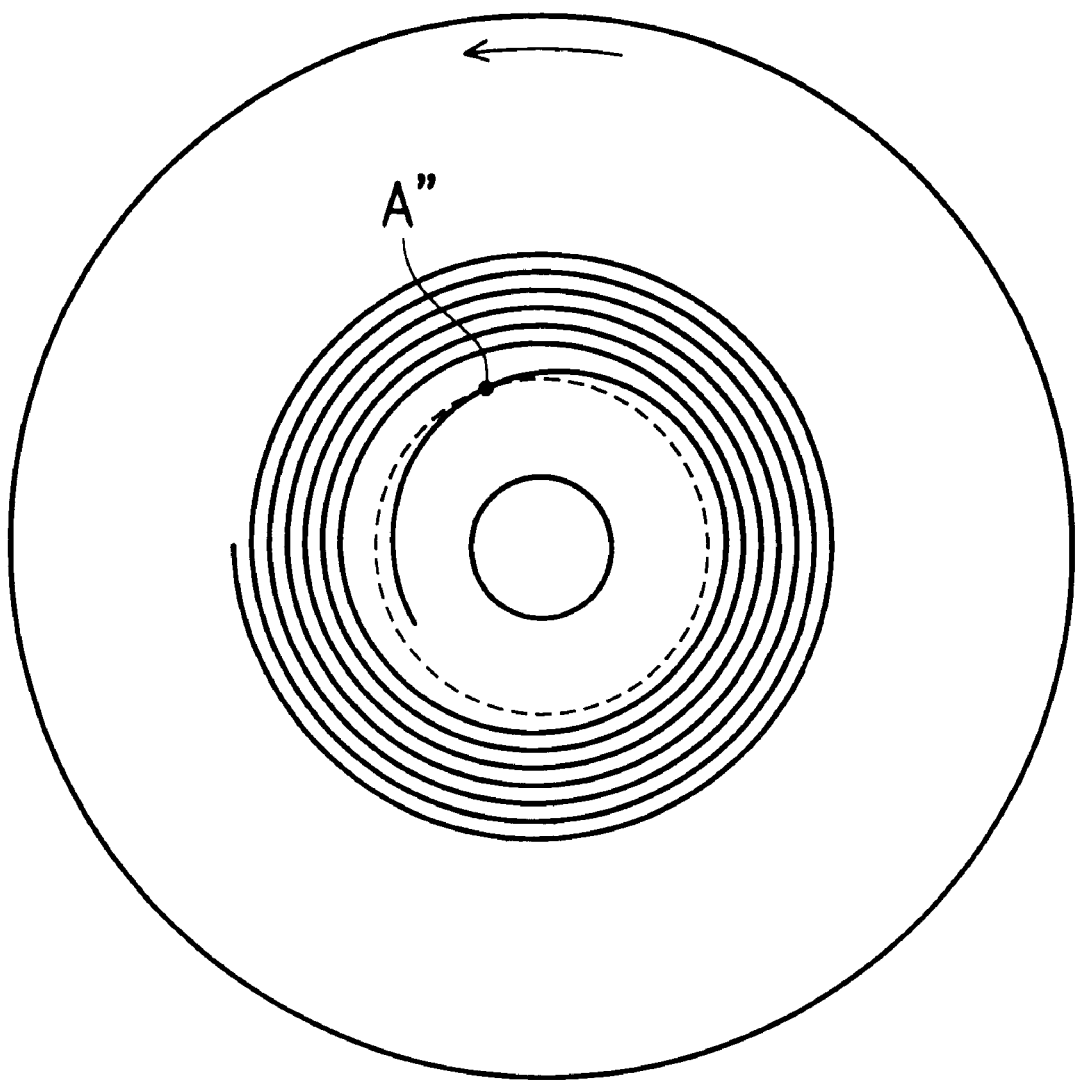
FIG. 2 is a diagram illustrating the relation of the track-jumping signal and the tracks being jumped by the pick-up when the pick-up is still and the optical disk is rotated.
Figure 3:
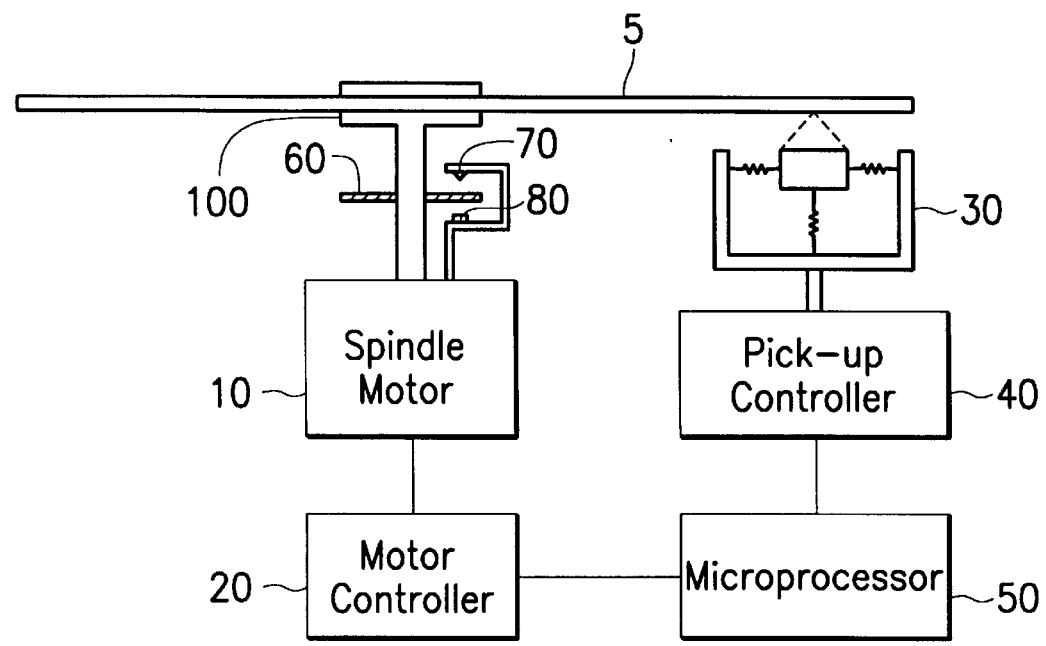
FIG. 3 is a block diagram of the apparatus for reducing the travel time for an optical pick-up according to the first embodiment of the present invention.

Referring to FIG. 3, according to one embodiment of this invention, an apparatus for reducing the travel time of an optical pick-up comprises: a spindle motor 10, a motor controller 20, an optical pick-up 30, a pick-up controller 40, a micro-processor 50.

The spindle motor 10 carries an optical disk by means of a turn table, which is arranged at one end of the spindle of the spindle motor and rotates the optical disk. The motor controller 20 controls the rotation speed of the spindle motor.

The optical pick-up 30 is used to access the optical disk. The pick-up controller 40 controls the tracking and focussing of the optical pick-up 30 while the optical pick-up 30 is accessing the optical disk.

The microprocessor 50 is used to divide the first duration by a second duration of the synchronous signal, which is measured under a known rotation speed, and then to multiply by the known rotation speed, so as to obtain a real rotation speed of the optical disk.

Figure 4:
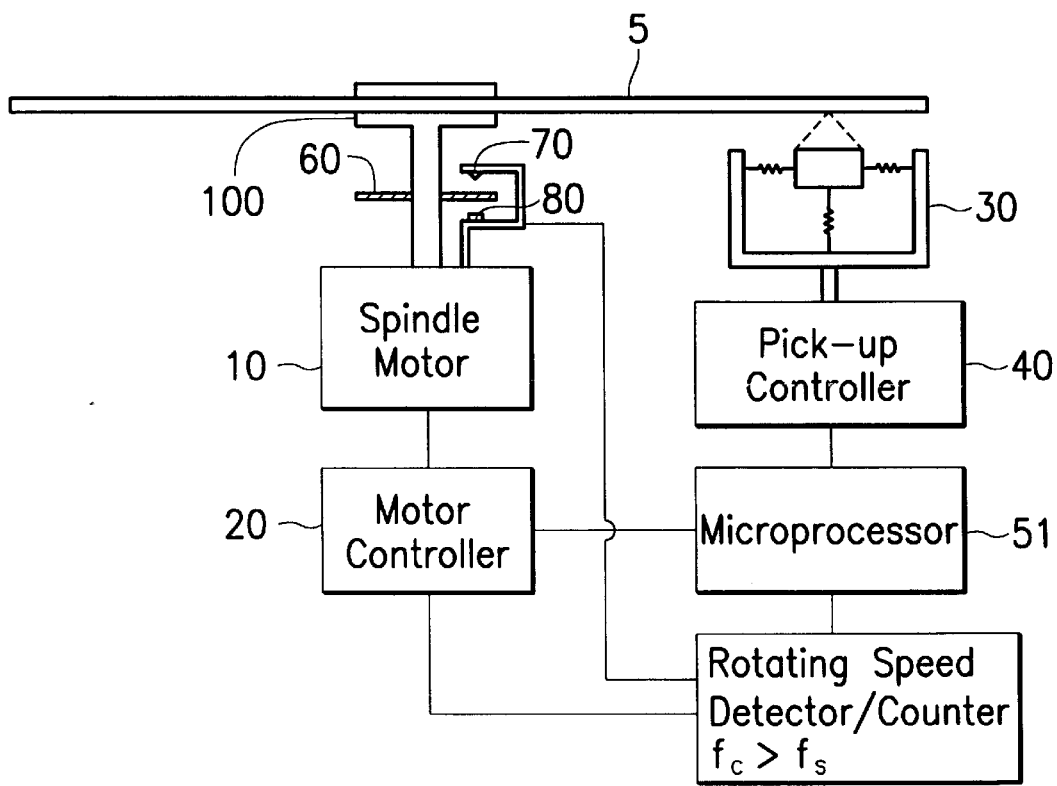
FIG. 4 is a block diagram of the apparatus for reducing the travel time for an optical pick-up according to the second embodiment of the present invention.
Figure 6:
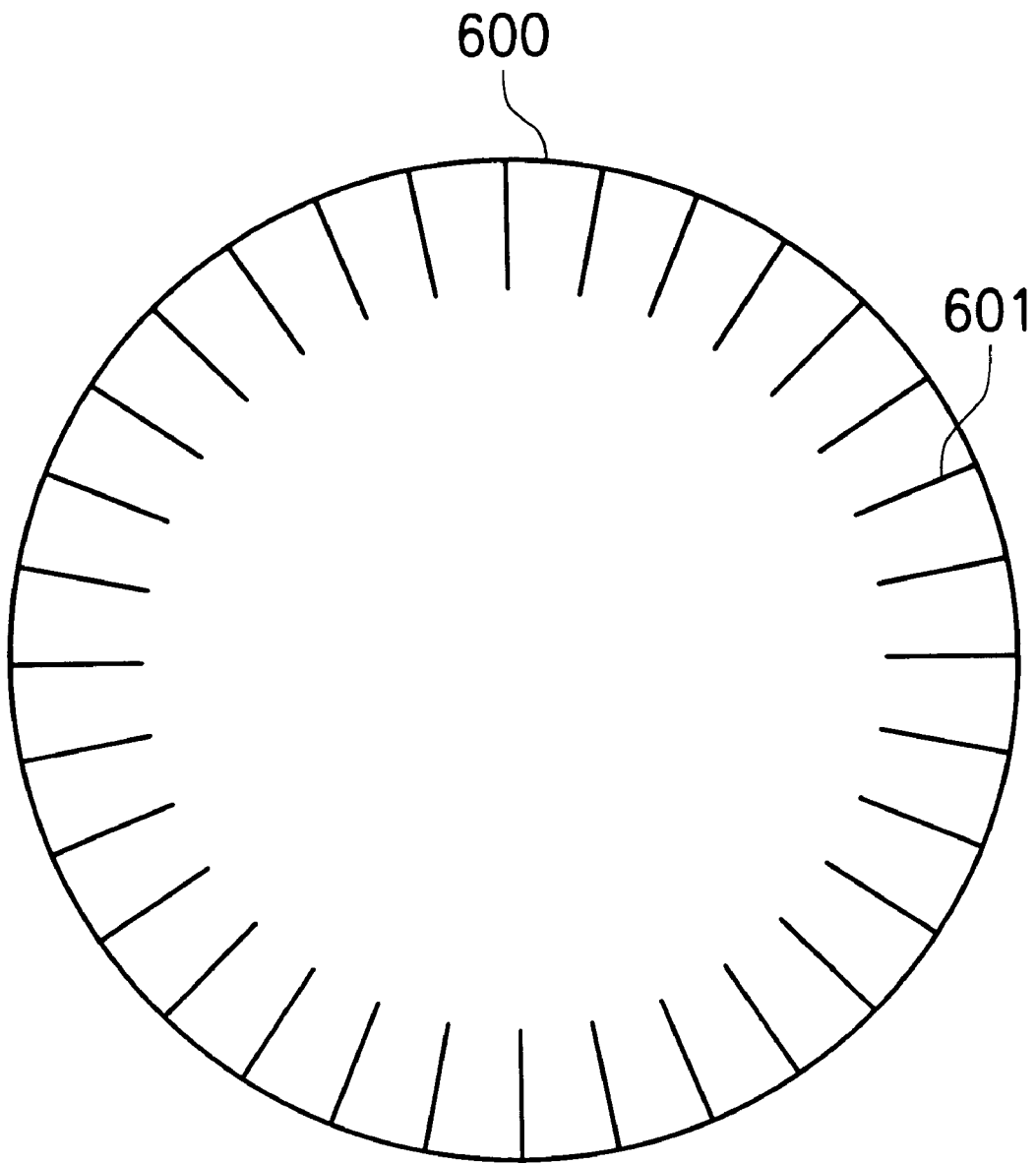
FIG. 6 shows a light-blocking device 600, including a plurality of light shields 601 which are spaced equally apart.

In the second embodiment, a number of light shields are disposed and equally spaced apart at proper positions on the spindle of the motor, as shown in FIG. 6. A photo sensor and a light-emitting device are placed on opposite sides of the plane of motion of the light shields. The photo sensor receives the light emitted from the light-emitting device. As the spindle rotates, the light shields periodically block the light beam. The real rotation speed of the optical disk can be obtained by dividing the number of times the light beam is blocked in a unit time by the number of light shields. Referring to FIG. 4, in this embodiment, the apparatus for reducing the travel time of an optical pick-up comprises: a spindle motor 10, a motor controller 20, an optical pick-up 30, a pick-up controller 40, a light-blocking device 60, a light-emitting device 70, a photo sensor 80, a rotation speed detector 52, and a microprocessor 51.

The spindle motor 10 carries an optical disk 5 by a turntable, which is arranged at one end of the spindle of the spindle motor 10, and rotates the optical disk 5. The motor controller 20 controls the rotation speed of the spindle motor.

The optical pick-up 30 is used to access the optical disk 5. The pick-up controller 40 controls the tracking and focussing of the optical pick-up 30 while the optical pick-up 30 is accessing the optical disk.

The light-blocking device 60 includes a number of light shields disposed and equally spaced apart at proper positions on the spindle of the motor. The photo sensor 80 and the light-emitting device 70 are placed on opposite sides of the plane of motion of the light shields. The photo sensor 80 receives the light emitted from the light-emitting device 70. As the spindle rotates, the light shields periodically block the light beam.

The rotation speed detector 52 is used to count the number of times the light beam is blocked in a unit time.

The microprocessor 51 receives an electric signal representing the number of times the light beam is blocked in a unit time, which it divides by the number of light shields so as to obtain a real rotation speed of the optical disk.

The rotation speed detector 52 can be a counter, in which case the internal clock signal of the counter must have a frequency fc higher than the frequency fs of the electric signal representing number of times the light is blocked.

Further, the detector, which consists of the light-blocking device 60, the light-emitting device 70 and the photo sensor 80, can be replaced by any apparatus that can provide a periodic pulse signal proportional to the rotation speed of the motor 10.

Figure 5:
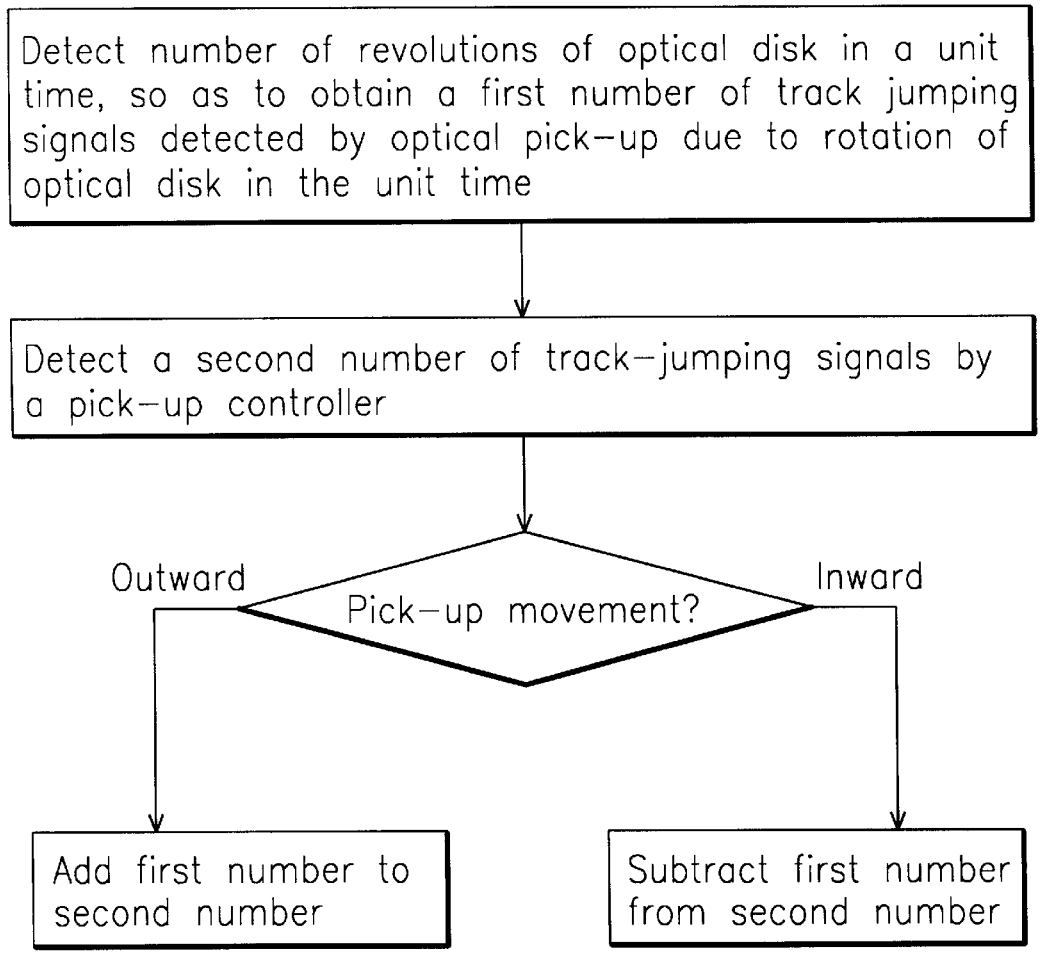
FIG. 5 is a flow chart showing a first embodiment of the method according to the present invention.

According to the first embodiment shown in FIG. 5, the method for reducing the travel time of an optical pick-up comprises the steps of: (i) multiplying the number of revolutions of the optical disc in a unit time by an estimated travel time by using a microprocessor so as to calculate the number of track jumping signals detected due to the rotation of the optical disc; and (ii) adding the number calculated in step (i) to the number of tracks required to be jumped for the optical pick-up to reach the desired location on the optical disc in the case that the optical pick-up moves inward, and subtracting the number calculated in step (i) from the number of tracks required to be jumped in the case that the optical pick-up moves outward, so that the real number of tracks being jumped by the optical pick-up in the unit time can be obtained. In accordance with the second embodiment shown in FIG. 6, the method for reducing the travel time of an optical pick-up comprises the steps of: (i) detecting the number of revolutions of the optical disc, which equals the number of tracks being jumped in a unit time due to the rotation of the optical disc, by a rotation speed detector; (ii) adding the number detected in step (i) to the number of tracks required to be jumped for the optical pick-up to reach the desired location on the optical disc in the case that the optical pick-up moves inward, and subtracting the number detected in step (i) from the number of tracks required to be jumped in the case that the optical pick-up moves outward, so that the real number of tracks being jumped by the optical pick-up in the unit time can be obtained.

In the above embodiments, after obtaining the data related to the real number of tracks being jumped, the microprocessor sends the data to the pick-up controller to precisely control the tracking of the optical pick-up. Accordingly, the travel time of the optical pick-up can be reduced since the tracking error is diminished.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives that have been discussed above and all equivalents thereto.

What is claimed is:

1. A method for reducing the travel time of an optical pick-up, comprising the steps of:

(i) detecting the number of revolutions of an optical disk in a unit time, so as to obtain a first number of track-jumping signals detected by the optical pick-up due to the rotation of the optical disk in the unit time;

(ii) adding the first number of track-jumping signals to a second number of track-jumping signals detected by a pick-up controller in the unit time in the case that the optical pick-up moves outward, and subtracting the first number of track-jumping signals from the second number of track-jumping signals detected by the pick-up controller in the unit time in the case that the optical pick-up moves inward, to calculate a real number of tracks being jumped by the optical pick-up in the unit time; and (iii) controlling the tracking of the optical pick-up based on the real number of tracks being jumped.

2. A method for reducing the travel time of an optical pick-up as claimed in claim 1, further comprising the step of providing a detecting device to detect the number of revolutions of the optical disk in the unit time, said detecting device operating as a counter.

3. An apparatus for reducing the travel time of an optical pick-up comprising:

a spindle motor for carrying an optical disk by means of a turn table which is arranged at one end of the spindle of the spindle motor, and rotating the optical disk;

a motor controller for controlling the rotation speed of the spindle motor;

a pick-up controller for controlling the tracking and focussing of the optical pick-up while said optical pick-up is accessing the optical disk, the pick-up controller detecting optical track jumps;

a light-blocking device, fixedly disposed between the turn table and the spindle motor, including a plurality of light shields which are spaced equally apart;

a light-emitting device for providing a light passing through the light-blocking device, so that a part of the light is interrupted by the plurality of light shields;

an photo sensor for detecting the light emitted from the light-emitting device and accordingly producing an electrical signal;

a detector for detecting the electrical signal, said detector providing a first number of times the light is interrupted; and, a microprocessor receiving the first number and calculating a second number, the second number being the number of times the light is interrupted in a unit time, and then dividing the second number by the number of light shields to obtain the number of tracks being jumped in a unit time due to rotation of the optical disk, the microprocessor then controlling the pick-up controller based upon the number of tracks being jumped in a unit time due to rotation of the optical disk.

4. An apparatus for reducing the travel time of an optical pick-up as claimed in claim 3 wherein the detector is a counter having an internal clock whose frequency is higher than that of the signal indicating the number of times the light is interrupted in a unit time.

* * * * *